July 11, 1950  A. H. PEDERSON ET AL  2,514,511
TESTING PAD ASSEMBLY
Filed Jan. 21, 1947  2 Sheets-Sheet 1
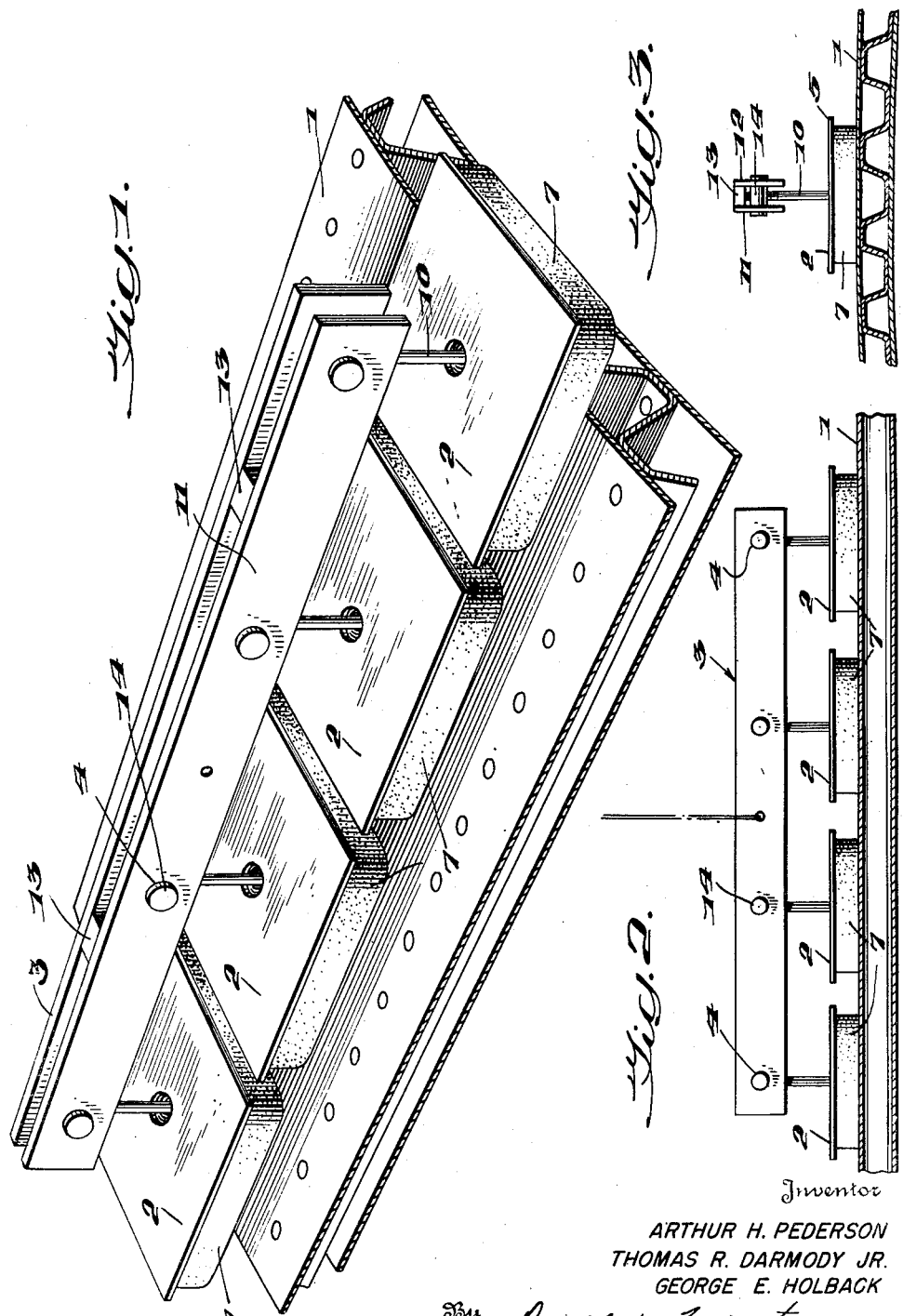
Inventor
ARTHUR H. PEDERSON
THOMAS R. DARMODY JR.
GEORGE E. HOLBACK
By Donald W. Farrington
Attorney July 11, 1950
A. H. PEDERSON ET AL
2,514,511
TESTING PAD ASSEMBLY
Filed Jan. 21, 1947
2 Sheets-Sheet 2
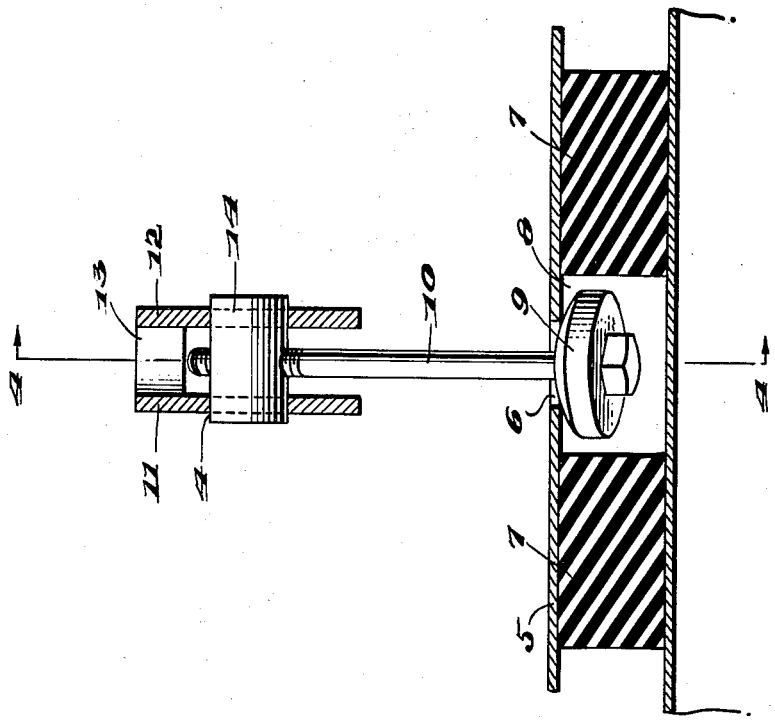
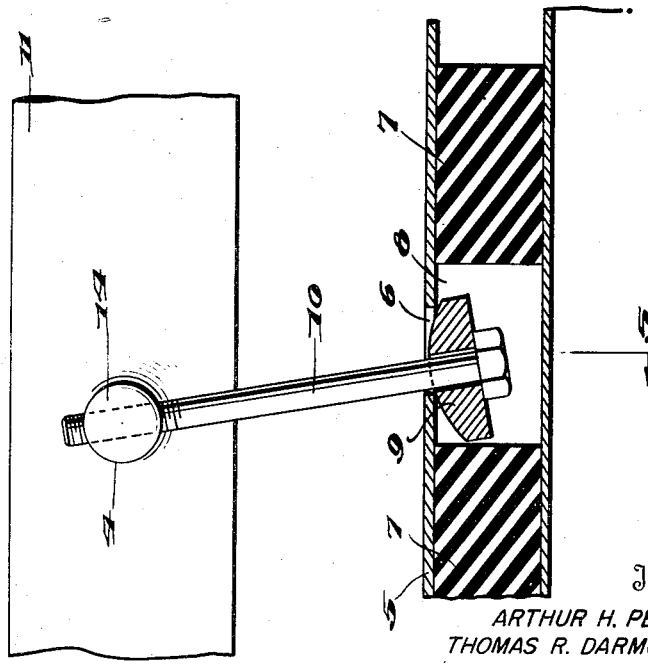
Inventor
ARTHUR H. PEDERSON
THOMAS R. DARMODY JR.
GEORGE E. HOLBACK
By Donald W. Farrington
Attorney Patented July 11, 1950

2,514,511

UNITED STATES PATENT OFFICE 2,514,511

TESTING PAD ASSEMBLY

Arthur H. Pederson and George E. Holback, Middle River, Md., and Thomas R. Darmody, Jr., Philadelphia, Pa., assignors to The Glenn L. Martin Company, Middle River, Md., a corporation of Maryland Application January 21, 1947, Serial No. 723,358

10 Claims. (Cl. 73—88)

This invention relates to testing apparatus primarily intended for use in the testing of aircraft structure.

While every effort is made by aircraft engineers to design structure that will withstand the dynamic and static loads that may be encountered in normal operation of the aircraft, there are some inherent weaknesses in design that may show up only after extended periods of time of use of the airplane. It is necessary in some instances to subject critical aircraft structure to fatigue tests or cyclic tests which are intended to similate actual conditions of flight, or maximum conditions expected to be encountered in flight, while the aircraft structure is assembled in a test jig. With this type of testing, the deflections of a structure in flight may be observed, and any failure of the structure studied during the cyclic testing.

In order to load the structure for testing, it is necessary to attach the loading equipment to the structure in some manner that does not, in any way, modify the structure or weaken it, such as would happen if holes were punched in the structure, or attaching plates added. Tension pads have been known and used prior to this invention, but with the tension pads of the prior art, it is very difficult to correlate the theoretical and test results. In general, a testing pad has been used which consists of a resilient pad of material having rubber-like physical characteristics. This pad is bonded to the surface of the specimen to be tested. To the opposite face of the pad, a loading plate is secured. In the prior art devices, a tension member is secured to a fitting or eyelet bracket on the loading plate. If the pad is used in a test in which the tension member is normal to the loading plate, test results can be correlated with the theoretical results, but due to the curved contour on aircraft structure, it is seldom that the tension members are arranged normal to the surface of the specimen. When the tension member forms some angle with the loading plate, or, in a fatigue or cyclic test, where the angle is constantly varying between the line of application of force through the tension member and the loading plate, the test results seldom can be correlated with theoretical results. This difficulty is overcome by the present invention, which provides a structure interconnecting the loading plate and tensioning member on a testing pad that causes the line of force in the tension member to pass through the center of the face of the pad attached to the structure to be tested.

The pads used prior to this invention were connected in pairs to the ends of pivoted bars, the pivots of which were attached to the ends of other pivoted bars until groups of many pads were collected to a single power strut by a movable arrangement of bars or whipple tree-like members. In such an arrangement, if one pad fails, the test must be stopped because the unbalance caused by the failure of one pad upsets the intended loading of the specimen. It has been found by the use of a single loading yoke to which several pads may be attached, usually four in number, that the failure of a single pad does not unduly unbalance the test.

It is an object of this invention to provide an improved arrangement of grouping testing pads in cyclic or static testing whereby the failure of one pad does not materially affect the test result.

It is another object of this invention to provide an improved testing pad assembly including means for mounting a tension member in the pad so that force is applied to the pad for all conditions of testing that will permit test results to be more closely correlated with theoretical test results.

It is a further object of this invention to provide a testing pad assembly wherein the line of application of force passes substantially through the center of the face of the pad bonded to the test specimen.

Further and other objects of this invention will become apparent from the description of the accompanying drawings which form a part of this disclosure and wherein like numerals refer to like parts.

In the drawings:

Figure 1 is a fragmentary perspective view showing the tension pads in place on an airplane wing skin.

Figure 2 is a side elevation of a four-pad bar assembly.

Figure 3 is an end view thereof.

Figure 4 is a sectional view taken on the line 4—4 of Figure 5.

Figure 5 is a sectional view taken on the line 5—5 of Figure 4.

The structure 1, shown in Figure 1, may be a double skin construction, as shown, or any airplane wing surface, or other structure on which test data may be desired. Tension pad assemblies 2 are cemented in place on the surface of the test specimen. These assemblies are then connected to yoke or bar 3, which is in turn connected to a tension member in the test rig.

The tension pad assembly, shown in detail in Figure 4, consists of a rigid, metal plate 5 having a circular aperture 6. A rubber tension pad 7 is cemented to plate 5. The rubber pad has at its center a hole 8 large enough to permit the assembly of spherical surface washer 9 and bolt 10.

The supporting bar or yoke assembly 3 consists of side members 11 and 12, which are spaced by members 13. Members 13 may be welded, or otherwise secured, between members 11 and 12. The spacing provided by members 13 is a little more than the diameter of bolt 10, so that this bolt may be readily inserted between members 11 and 12 and threaded into an opening in cylindrical member 14. Member 14 is inserted in aligned bored holes 4 in members 11 and 12, and affords a bearing and support for bolt 10.

By this structure, more accurate test results may be obtained. That is, results may be obtained that can be more closely coordinated with theoretical computations. This is due primarily to the cooperation of the specific structural elements described above. It will be noted that when the tension force is applied to the tension pad at an angle, other than normal to the surface to be tested, the spherical washer will govern the position of the bolt in hole 6. The axis of the bolt, for any inclined position, will pass through the point at the surface of the skin directly under the center of hole 6. Manufacturing tolerances, particularly variation in the thickness of the rubber pad, may cause the thrust line through the bolt to vary slightly, but the thrust line will be generally as described through a predetermined spot on the skin relative to the pad, and the accuracy of the results will be in accordance with the amount of deviation of the structure from the theoretical location of the thrust line.

To set up a specimen for test, the spherical washers and bolts are assembled in the tension pad, which consists of plate 5 and rubber pad 7, previously assembled. The tension pads, with bolts and washers assembled, are bonded to the surface of the test specimen at predetermined spacings, corresponding to the spacing of the holes in bar 3 through which extend cylindrical members 14. When the pads have been bonded to the specimen, several pads are connected to bar 3. It has been found that a very efficient arrangement consists of assembling four pads to one bar. The lugs are placed through the holes in bar 3, and bolts 10 are threaded into and retained by members 14. If a straight tension load is to be applied by bar 3, the bolts will assume a position normal to the surface of the specimen. If tension and drag loads are to be applied to the specimen, bolts 10 will assume an inclined position, but their line of thrust will pass substantially through the theoretical center of the pad at the surface of the specimen.

It can be seen with this arrangement that the failure of one pad merely distributes the load over the remaining pads, but does not materially affect the remainder of the test set-up wherein many yokes, such as 3, are collected together and secured to a single hydraulic jack. It can also be seen that the location of the pads is less critical for loads other than normal tension loads in that the pads can be aligned or centered over the points where it is desired to apply the force and the swiveling connections of the tension member to the loading plate will insure the proper alignment of the tension member to apply the force to predetermined areas on the specimen. This is particularly valuable in cyclic testing where the line of force in the tension member may be continuously varied with respect to the pad and surface undergoing test.

It is to be understood that certain changes, alterations, modifications and substitutions can be made without departing from the spirit and scope of the appended claims.

We claim as our invention:

1. A testing assembly comprising a loading yoke, a plurality of resilient pads, each having one face thereof bonded to a specimen to be tested, and the other face bonded to a loading plate member, each loading plate member being secured to said yoke by a tension member, said yoke including a pair of elongated spaced plates and rigid means for holding said plates in fixed spaced relation, a cylindrical member mounted in apertures in said plates for pivotal movement about an axis normal to said plates, said cylindrical member having a threaded hole positioned between said spaced plates, said tension member comprising a bolt threaded into said cylindrical member for pivotal motion relative to said plates, said loading plate member being formed with an aperture in the center thereof through which extends the head of said bolt, a washer mounted on the bolt adjacent the head having one side formed with a spherical contour abutting the aperture in the loading plate member on the side bonded to said pad, the radius of curvature of said washer face being such as to cause the axis of force exerted by said tension member for any inclined position of said tension member to pass substantially through the center of the face of the pad secured to the specimen.

2. A testing assembly comprising a loading yoke, at least three resilient pads having one face thereof bonded to the specimen to be tested, and the other face bonded to a loading plate member, each loading plate member being secured to said yoke by a tension member, said yoke including a pair of elongated plates and rigid means for holding said plates in spaced relation, pivoted means mounted in said spaced plates to which said tension members are secured, means for securing each tension member to its loading plate member comprising a universal connection therebetween having its effective center spaced from said plate member and adjacent the face of the pad secured to the specimen whereby to provide for limited universal swinging movement of the tension member relative to its plate member about said effective center.

3. A testing assembly having a loading yoke, at least three resilient pad means bonded on one face to the surface of a test specimen, a loading plate means bonded to the other face of each said test pad means, tension transmitting means secured to said yoke, and a universal connection between the tension transmitting means and the loading plate means, the effective center of which is located at a point spaced from said plate means and adjacent the center of the face of the pad bonded to the specimen whereby the axis of force application of said tension transmitting means will always extend substantially through the center of the face of the pad bonded to the specimen.

4. A tension testing assembly having a loading yoke, at least three resilient sponge rubber pads, or the like, each bonded on one face to the surface of the specimen to be tested and on the other face to a loading plate substantially coextensive with the face of the pad, said loading plate having an aperture formed in the center thereof, a tension force transmitting member having one end extending through said aperture and the other end pivotally secured to said yoke, the end of said tension force transmitting member within the aperture being formed with a spherically contoured surface abutting the inside edge of the aperture, said spherically contoured face being of such a radius that it will seat in said aperture in such a manner that the axis of the tension force transmitting member will extend substantially through the center of the face of the pad in contact with the specimen.

5. A tension testing pad assembly having a resilient sponge rubber pad, or the like, bonded on one face to the surface of the specimen to be tested and on the other face to a loading plate substantially coextensive with the face of the pad, said loading plate having an aperture formed in the center thereof, a tension force transmitting member extending through said aperture, the end of said tension force transmitting member within the aperture being formed with a spherically contoured surface abutting the inside edge of the aperture, said spherically contoured face being of such a radius that it will seat in said aperture in such a manner that the axis of the tension force transmitting member will extend substantially through the center of the face of the pad in contact with the specimen.

6. A testing pad assembly having a resilient sponge pad adapted to be bonded on one face to the surface of the specimen to be tested, a loading plate bonded to the other face of said pad, a force transmitting member, and means swivelably securing said member to said plate comprising a universal connection therebetween, the effective center of which is located substantially at the face of the pad to be bonded to the specimen whereby to provide for limited universal swinging movement of said member about said effective center.

7. A testing pad assembly having a resilient pad of sponge material having rubber-like physical characteristics, said pad being bonded on one side to a loading plate and on the other side to the specimen to be tested, a tension member to transmit a force to said specimen, and a universal connection between said tension member and said loading plate, the effective center of which is located at a point spaced from said plate and adjacent the center of the surface of the pad attached to said specimen, whereby the axis of force application of said tension member will always extend substantially through the center of said surface of the pad.

8. A testing assembly comprising a loading yoke, a plurality of resilient pad means, each having one face thereof bonded to the specimen to be tested, and the other face bonded to a loading plate member, each loading plate member being secured to said yoke by a tension member, means for swingably securing each of said tension members to said yoke and said loading plate member to cause the axis of force exerted by said tension member to pass substantially through the center of the face of the pad secured to the specimen for any inclined position of said tension member and comprising a limited universal connection between each plate and its tension member, the effective center of which lies adjacent the face of the pad secured to the specimen.

9. A testing assembly comprising a loading yoke, a plurality of resilient pads having one face thereof bonded to the specimen to be tested, and the other face bonded to a loading plate member, each loading plate member being secured to said yoke by a tension member, said yoke including a pair of elongated plates and rigid means for holding said plates in spaced relation, pivoted means mounted in said spaced plates to which said tension members are secured, means for swingably securing each tension member to its loading plate member to cause the axis of force exerted by said tension member to pass substantially through the center of the face of the pad secured to the specimen for any inclined position of said tension member and comprising a limited universal connection between each plate and its tension member, the effective center of which lies adjacent the face of the pad secured to the specimen.

10. A testing assembly comprising a loading yoke, a plurality of resilient pads, each having one face thereof bonded to a specimen to be tested, and the other face bonded to a loading plate member, each loading plate member being secured to said yoke by a tension member, said yoke including a pair of elongated spaced supporting members fixed in spaced relation having apertures formed therein, cylindrical members mounted in apertures in said plates for pivotal movement about an axis normal to said plates, said cylindrical members having threaded holes positioned between said supporting members, said tension member comprising a bolt threaded into each said cylindrical member for pivotal motion relative to said supporting members, said loading plate member being formed with an aperture in the center thereof through which extends the head of said bolt, a washer mounted on the bolt adjacent the head having one side formed with a spherical contour abutting the aperture in the loading plate member on the side bolted to said pad, the radius of curvature of said washer face being such as to cause the axis of force exerted by said tension member for any inclined position of said tension member to pass substantially through the center of the face of the pad secured to the specimen.

ARTHUR H. PEDERSON.
GEORGE E. HOLBACK.
THOMAS R. DARMODY, Jr.

REFERENCES CITED

The following references are of record in the file of this patent:

UNITED STATES PATENTS

| Number | Name | Date |
|---|---|---|
| 1,341,431 | Morrow | May 25, 1920 |
| 1,596,317 | Skinner | Aug. 18, 1926 |
| 2,383,491 | Kemmer et al. | Aug. 28, 1945 |